(12) United States Patent
Lin et al.

(10) Patent No.: US 11,494,282 B2
(45) Date of Patent: Nov. 8, 2022

(54) METHOD, DEVICE AND COMPUTER PROGRAM PRODUCT FOR SENSOR DATA ANALYSIS

(71) Applicant: EMC IP Holding Company LLC, Hopkinton, MA (US)

(72) Inventors: Zhenzhen Lin, Shanghai (CN); Pengfei Wu, Shanghai (CN); Si Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 658 days.

(21) Appl. No.: 16/536,599

(22) Filed: Aug. 9, 2019

(65) Prior Publication Data

US 2020/0342272 A1    Oct. 29, 2020

(30) Foreign Application Priority Data

Apr. 25, 2019   (CN) .......................... 201910340141.0

(51) Int. Cl.
  *G06F 11/30*    (2006.01)
  *G06K 9/62*     (2022.01)
  *H04L 67/12*    (2022.01)
  *G06N 20/00*    (2019.01)

(52) U.S. Cl.
  CPC ........ *G06F 11/3058* (2013.01); *G06K 9/6276* (2013.01); *G06K 9/6289* (2013.01); *G06N 20/00* (2019.01); *H04L 67/12* (2013.01)

(58) Field of Classification Search
  None
  See application file for complete search history.

(56) References Cited

U.S. PATENT DOCUMENTS

| | | | |
|---|---|---|---|
| 2008/0215609 A1* | 9/2008 | Cleveland | G06F 16/24556 707/999.102 |
| 2017/0284839 A1* | 10/2017 | Ojala | G01D 21/00 |
| 2018/0285231 A1* | 10/2018 | Kakuta | G06F 11/3062 |

OTHER PUBLICATIONS

K. Zhang et al., "Machine Learning-Based Temperature Prediction for Runtime Thermal Management Across System Components," IEEE Transactions on Parallel and Distributed Systems, Feb. 1, 2018, pp. 405-419, vol. 29, No. 2.

(Continued)

*Primary Examiner* — Qing Chen
(74) *Attorney, Agent, or Firm* — Ryan, Mason & Lewis, LLP

(57) ABSTRACT

Methods, devices and computer program products for data analysis are provided. For example, a method comprises: in response to receiving target data from a target sensor at a first time, determining one or more reference sensors based on location information of a neighbor sensor adjacent to the target sensor and a second time of receiving the latest data from the neighbor sensor; determining reference estimation data of the one or more reference sensors at the first time based on historical sensor data obtained from the one or more reference sensors; determining target estimation data of the target sensor at the first time based on the reference estimation data; and detecting abnormity of the target data based on the target data and the target estimation data. In this way, abnormity of the sensor data may be detected efficiently and accurately.

20 Claims, 6 Drawing Sheets

(56) References Cited

OTHER PUBLICATIONS

Wikipedia, "Kalman Filter," https://en.wikipedia.org/w/index.php?title=Kalman_filter&oldid=902108093, Jun. 16, 2019, 30 pages.
codeplea.com, "Interpolating in a Triangle," https://codeplea.com/triangular-interpolation, Nov. 30, 2016, 8 pages.
T.J. Chung, "Computational Fluid Dynamics," Cambridge University Press, Second Edition, Sep. 27, 2010, 21 pages.
spark.apache.org, "Clustering—RDD-Based API," http://spark.apache.org/docs/latest/mllib-clustering.html, downloaded Jun. 27, 2019, 20 pages.
S. Ahmad et al., "Unsupervised Real-Time Anomaly Detection for Streaming Data," Neurocomputing, Apr. 22, 2017, pp. 134-147.

* cited by examiner

METHOD, DEVICE AND COMPUTER PROGRAM PRODUCT FOR SENSOR DATA ANALYSIS

RELATED APPLICATION(S)

The present application claims priority to Chinese Patent Application No. 201910340141.0, filed Apr. 25, 2019, and entitled "Method, Device and Computer Program Product for Data Analysis," which is incorporated by reference herein in its entirety.

FIELD

Embodiments of the present disclosure relate to the field of computers, and more specifically to a method, a device and a computer program product for data analysis.

BACKGROUND

In recent years, with the development of computer technologies, the Internet of Things has been increasingly applied to all aspects of people's lives. One core of the Internet of Things technology is the analysis of data obtained by sensors (e.g., a temperature sensor, a position sensor, an image sensor, etc.), and these sensors may advantageously help people make early warnings or predictions. However, such sensor data are usually massive. Therefore, how to efficiently analyze the massive sensor data in the Internet of Things has become a current focus of concerns.

SUMMARY

Embodiments of the present disclosure provide a solution of data analysis.

According to a first aspect of the present disclosure, there is provided a method for data analysis. The method comprises: in response to receiving target data from a target sensor at a first time, determining one or more reference sensors based on location information of a neighbor sensor adjacent to the target sensor and a second time of receiving the latest data from the neighbor sensor; determining reference estimation data of the one or more reference sensors at the first time based on historical sensor data obtained from the one or more reference sensors; determining target estimation data of the target sensor at the first time based on the reference estimation data; and detecting abnormity of the target data based on the target data and the target estimation data.

According to a second aspect of the present disclosure, there is provided a device for data analysis. The device comprises: at least one processing unit; and at least one memory. The at least one memory is coupled to the at least one processing unit and stores instructions for execution by the at least one processing unit. The instructions, when executed by the at least one processing unit, cause the device to perform acts comprising: in response to receiving target data from a target sensor at a first time, determining one or more reference sensors based on location information of a neighbor sensor adjacent to the target sensor and a second time of receiving the latest data from the neighbor sensor; determining reference estimate data of the one or more reference sensors at the first time based on historical sensor data obtained from the one or more reference sensors; determining target estimation data of the target sensor at the first time based on the reference estimation data; and detecting abnormity of the target data based on the target data and the target estimation data.

According to a third aspect of the present disclosure, there is provided a computer program product being stored in a non-transitory computer storage medium and comprising machine-executable instructions. The machine-executable instructions, when executed by a device, cause the device to execute any step of the method described according to the first aspect of the present disclosure.

This Summary is provided to introduce a selection of concepts that are further described below in the Detailed Description. This Summary is not necessarily intended to identify each and every key feature or essential feature of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in exemplary embodiments of the present disclosure.

DETAILED DESCRIPTION

Figure 1:
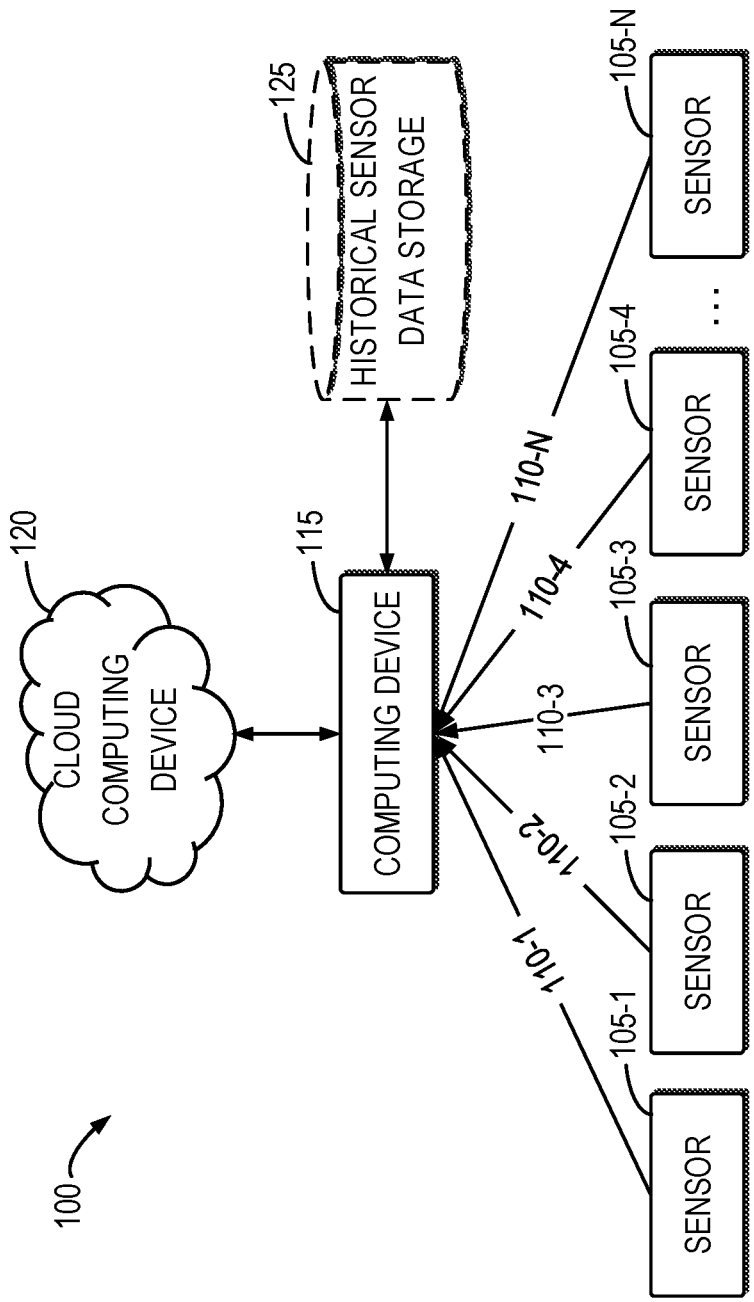
FIG. 1 illustrates a schematic diagram of an environment in which embodiments of the present disclosure may be implemented.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second"

and others may denote different or identical objects. The following text may also contain other explicit or implicit definitions.

In a fully connected Internet of Things system, there may be a large number of sensors. A powerful computing capability is required for the processing of massive sensor data generated by these sensors, and computing solely relying on cloud computing devices may not be sufficient to meet the demands for the computing capability. Some traditional solutions establish edge computing devices between cloud computing devices and sensors, and part of the computing tasks may be performed by the edge computing devices, for example, data preprocessing, anomaly data detection, and the like.

FIG. 1 shows a schematic diagram of an environment 100 in which embodiments of the present disclosure may be implemented. As shown in FIG. 1, the environment 100 includes a computing device 115, one or more sensors 105-1, 105-2, 105-3, 105-4, . . . 105-N (alone or collectively referred to as sensor 105) and a cloud computing device 120. In some embodiments, the computing device 115 may be an edge server configured to receive sensor data 110-1, 110-2, 110-3, 110-4, . . . 110-N (alone or collectively referred to as sensor data 110) from the one or more sensors 105, and perform operations such as data preprocessing and abnormal data monitoring. The processed data may be sent to the cloud computing device 120 for further processing. It should be appreciated that the number of sensors shown in FIG. 1 is merely illustrative and should not be construed as limiting the scope of the present disclosure. Any suitable number of sensors may be employed.

In some conventional solutions, the computing device 115 (e.g., an edge server) usually uses a method such as machine learning to detect abnormity in sensor data 110 received from the one or more sensors 105. Such detecting method usually requires a large amount of calculation, and it is therefore difficult to meet the need for real-time detection of data abnormality. However, in the Internet of Things technology, it has become increasingly important to detect sensor data abnormity quickly and efficiently. For example, in a scenario where a speed sensor is used to detect a vehicle's operating state, quickly detecting anomalous speed to predict a possible car accident is a very important application.

According to an embodiment of the present disclosure, a solution of data analysis is provided. In this aspect, when target data is received from a target sensor at a first time, one or more reference sensors may be determined based on location information of a neighbor sensor adjacent to the target sensor and a second time of receiving the latest data from the neighbor sensor. Subsequently, reference estimation data of the one or more reference sensors at the first time may be further determined based on historical sensor data obtained from the one or more reference sensors. The reference estimation data may be used to determine target estimation data of the target sensor at the first time, and detect an abnormality of the target data based on the target data and the target estimation data. By determining whether the data of the target sensor is abnormal using the historical sensor data of the reference sensors around the target sensor, the embodiment of the present disclosure may reduce the amount of calculation required to determine the data abnormality, and may more accurately determine the data abnormality.

Figure 2:
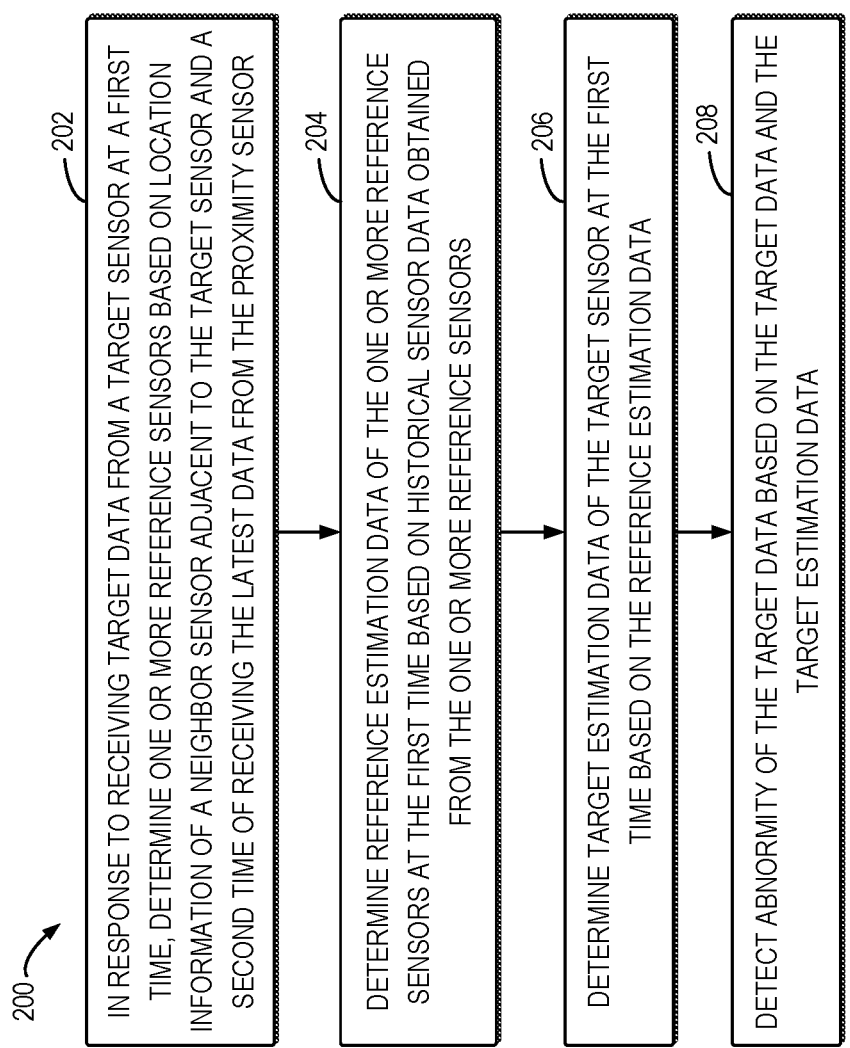
FIG. 2 illustrates a flow chart of a process of data analysis according to an embodiment of the present disclosure.

A process of data analysis according to an embodiment of the present disclosure will be described below with reference to FIG. 2 to FIG. 4. FIG. 2 illustrates a flow diagram of a process 200 of data analysis according to some embodiments of the present disclosure. The process 200 may be implemented by the computing device 115 (e.g., an edge server) in FIG. 1. For ease of discussion, a process 200 of detecting abnormity of the sensor data 110-1 from target sensor 105-1 will be described below in conjunction with FIG. 1.

At block 202, in response to receiving the target data 110-1 from the target sensor 105-1 at the first time, the computing device 115 determines one or more reference sensors based on location information of a neighbor sensor adjacent to the target sensor 105-1 and a second time of receiving the latest data from the neighbor sensor. The process of block 202 will be described below with reference to FIG. 3 and FIG. 4, wherein FIG. 3 shows a schematic diagram 300 of determining a reference sensor in accordance with an embodiment of the present disclosure. As shown in FIG. 3, FIG. 3 shows an example spatial distribution of the target sensor 105-1 and one or more neighbor sensors 105-2, 105-3, and 105-4, wherein the neighbor sensors 105-2, 105-3 and 105-4 may refer to sensors whose distance from the position of the target sensor 105-1 is less than a predetermined distance threshold.

In some embodiments, the computing device 115 may determine the neighbor sensors 105-2, 105-3 and 105-4 adjacent to the target sensor 105-1 based on location information of the one or more sensors 105 included in environment 110. For example, location information for the one or more sensors 105 may be pre-stored in a predetermined storage device, and the computing device 115 may read associated location information from the storage device to determine a plurality of neighbor sensors 105-2, 105-3 and 105-4. As another example, the location information of the one or more sensors 105 may also be included in the sensor data 110 transmitted to the computing device 115, and the computing device 115 may extract associated location information from the sensor data 110 to determine the plurality of neighbor sensors 105-2, 105-3 and 105-4.

Alternatively, information for indicating one or more neighbor sensors of the target sensor 105-1 (e.g., identification information of the sensors) may be pre-stored in a predetermined storage device, and the computing device 115 may read the information from the storage device to determine the one or more neighbor sensors 105-2, 105-3 and 105-4. In such a manner, the amount of calculation required to determine the neighbor sensors may be further reduced. In this embodiment, the distance from the one or more neighbor sensors 105-2, 105-3 and 105-4 to the target sensor 105-1 may also be pre-stored.

During operation, the computing device 115 receives target data 110-1 from the target sensor 105-1 at the first time (referred to as T1 for convenience of description), and receives the latest sensor data 110-2, 110-3 and 110-4 from the neighbor sensors 105-2, 105-3 and 105-4 at time T2, T3 and T4 respectively. In some embodiments, time information T1, T2, T3 and/or T4 may be included in the sensor data 110 that is transmitted to the computing device 115. In some embodiments, the computing device 115 may also record a corresponding time (T1, T2, T3 and/or T4) of receiving the sensor data 110 and store it in a predetermined storage device.

After obtaining the location information (e.g., spatial coordinates and/or absolute distance from the target sensor 105) of the one or more neighbor sensors 105-2, 105-3 and 105-4 and the corresponding second time information T2, T3 and T4, the computing device 115 may determine one or more reference sensors from one or more neighbor sensors 105-2, 105-3 and 105-4 for determining whether the target data 110-1 is abnormal. In one example, the computing device 115 may compare distances from the neighbor sensors 105-2, 105-3 and 105-4 to the target sensor 105-1 with a predetermined distance threshold, and compare time differences between the time T2, T3 and T4 and the first time T1 with a predetermined time threshold. The computing device 115 may select a neighbor sensor having a distance less than the predetermined distance threshold and a time difference less than the time threshold as the reference sensor. It should be understood that the distance threshold and the time threshold may be adaptively set based on the types of sensors. For example, for a sensor with a long sampling period, the time threshold may be relatively large; for a sensor with a short sampling period, the time threshold may be set to a smaller value accordingly. In this manner, the computing device 115 may determine a reference sensor that is both spatially close to the target sensor 105-1 and temporally close to the time T1 when the target data 110-1 is obtained.

In another embodiment, one or more reference sensors may also be determined based on weighting of the distance and the time difference. Specifically, a flowchart of a process 202 of determining the reference sensor in accordance with an embodiment of the present disclosure will be described in detail below with reference to FIG. 4.

Figure 4:
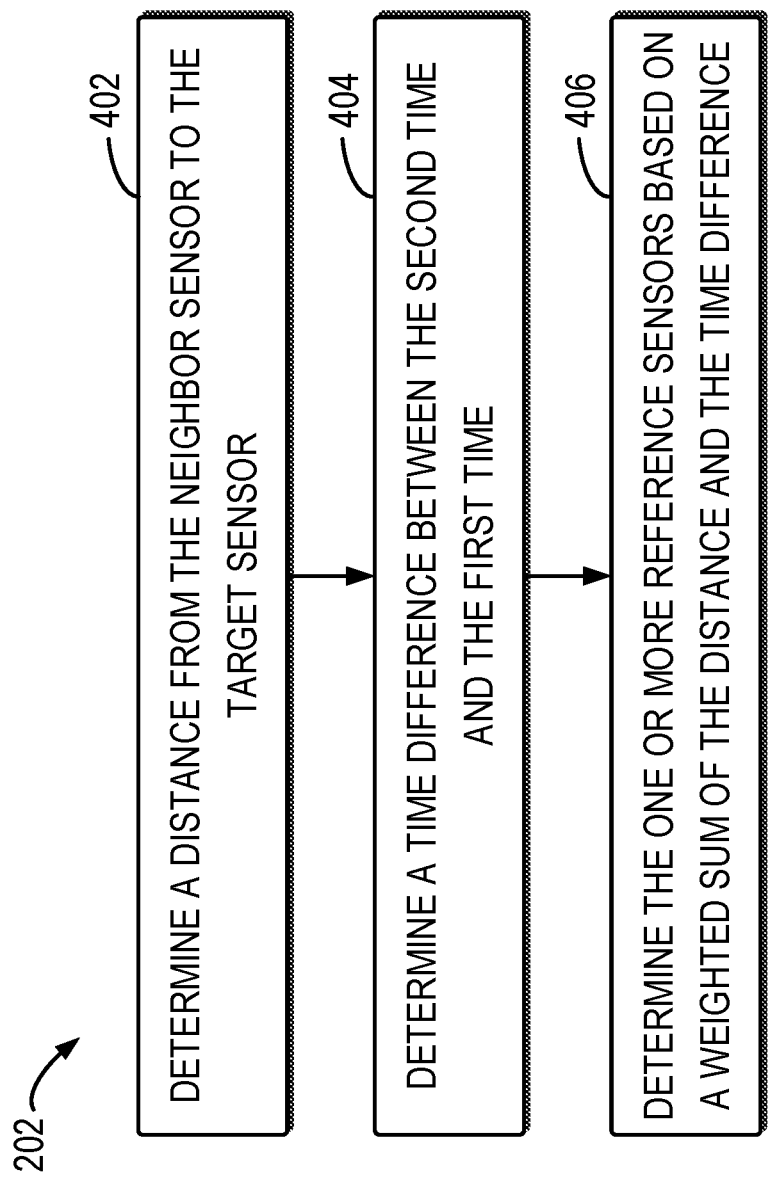
FIG. 4 illustrates a flow chart of a process of determining a reference sensor in accordance with an embodiment of the present disclosure.

As shown in FIG. 4, at block 402, the computing device 115 may determine the distances from the neighbor sensors 105-2, 105-3 and 105-4 to the target sensor 105-1. As described above, the computing device 115 may obtain the pre-stored distance information from the storage device, or the computing device 115 may also determine the corresponding distance based on the location information.

At block 404, the computing device 115 may determine time differences between the time T2, T3 and T4 and the first time T1. As described above, the information indicating the time T2, T3 and T4 may be stored in the predetermined storage device, and the computing device 115 may read the information indicating the time T2, T3 and T4 from the storage device at the first time T1 when the target data 110-1 is received.

At block 406, the computing device 115 determines one or more reference sensors based on a weighted sum of the distances and time differences. Specifically, the computing device 115 may set respective weighting coefficients for the distances and time differences, respectively. It should be understood that the weighting coefficients may be adaptively set based on the types of sensors. Such weighting coefficients may also be manually modified or adjusted according to actual use to determine a reference sensor capable of more accurately determining the abnormality of the target data 110-1.

Figure 3:
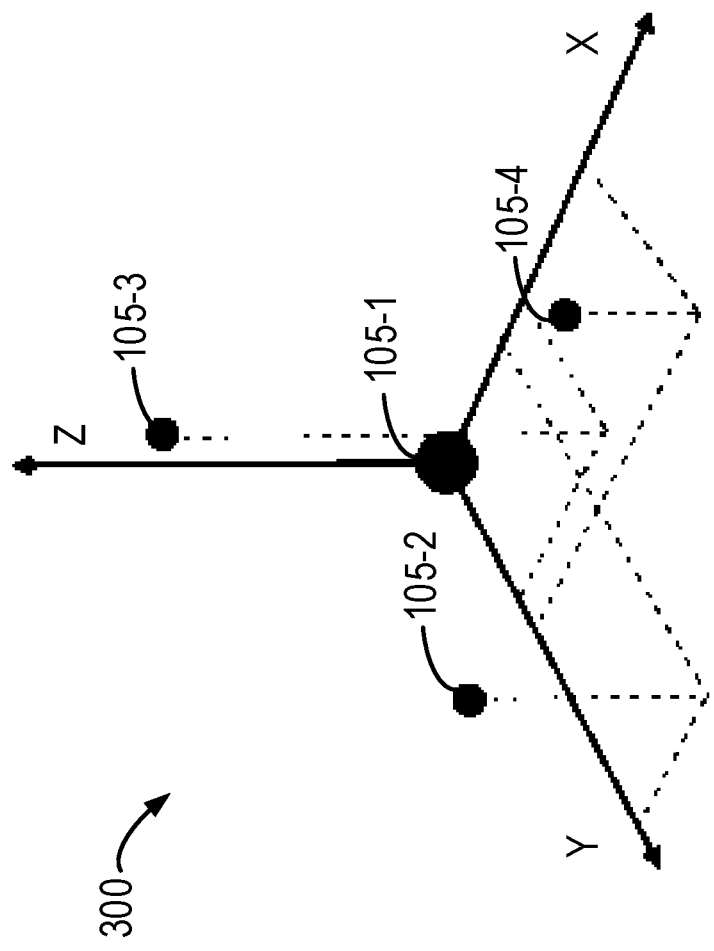
FIG. 3 illustrates a schematic diagram of determining a reference sensor in accordance with an embodiment of the present disclosure.

For example, in the example of FIG. 3, the distances from the neighbor sensors 105-2, 105-3 and 105-4 to the target sensor 105-1 are D1, D2, and D3, respectively, and the time differences between time T2, T3 and T4 and the first time T1 are t1, t2 and t3, respectively, wherein a distance weight is preset to a, and a weight of the time difference is preset to β. The computing device 115 may further compare the weighted sum of the distances and the time differences with a predetermined threshold, and select a neighbor sensor having a weighted sum less than the threshold as the reference sensor. In this manner, the computing device 115 may determine sensors that are similar to the target sensor 105-1 in both time and space. For example, the distance D2 between the neighbor sensor 105-3 and the target sensor 105-1 in FIG. 3 is the smallest, but the time difference t2 therebetween is large, and such a sensor might not be adapted for subsequent prediction of the value of the target sensor since historical sensor data obtained therefrom might not have a value for referencing. Similarly, the time difference t3 between the neighbor sensor 105-4 and the target sensor 105-1 in FIG. 3 is the smallest, but the distance D3 therebetween is larger, and such a sensor might not be adapted for subsequent prediction of the value of the target sensor because the historical sensor data obtained therefrom might fail to accurately characterize the target sensor 105-1.

Furthermore, to ensure that the distribution of reference sensors of the target sensor 105-1 is relatively average, in some embodiments, the computing device 115 may first determine groups of neighbor sensors located in different directions of the target sensor. Using FIG. 3 as an example, the computing device 115 may use the location of the target sensor 105 as the origin of the coordinate system and divide adjacent neighbor sensors into eight groups of neighbor sensors in quadrant.

The computing device 115 may also select at most a predetermined number of reference sensors from each group of a plurality of groups of neighbor sensors based on the method of determining a reference sensor described above. For example, it may be specified that at most 2 reference sensors may be selected from each group of neighbor sensors. As an example, when a plurality of neighbor sensors in one group of neighbor sensors satisfy a threshold condition through block 406, the computing device 115 may select neighbor sensors whose weighted sum rank top 2 as reference sensors. In this way, it is possible to avoid the excessive calculation amount caused by excessive selection of the reference sensors, while ensuring that the reference sensors are spatially distributed more uniformly.

Further referring to FIG. 2, at block 204, the computing device 115 determines reference estimate data of one or more reference sensors at a first time based on historical sensor data acquired from one or more reference sensors. Continuing with FIG. 3 as an example, for example, the computing device 115 may determine that the reference sensors are sensor 105-2 and sensor 105-3. In some embodiments, historical sensor data associated with reference sensors 105-2 and 105-3 may be pre-stored, for example, in a historical sensor data storage 125 as shown in FIG. 1.

In some examples, historical sensor data may include all sensor data received from reference sensors 105-2 and 105-3 over a period of time (e.g., one month). Further, the computing device 115 may, for example, read historical sensor data from the historical sensor data storage 125, and may determine the reference estimation data, for example, based on the historical sensor data at a time corresponding to the first time T1 in one day of the period of time. For example, the first time T1 is 12:00 of March 2, and the computing device 115 may, for example, regard the historical sensor data from the reference sensors 105-2 and 105-3 around 12:00 on March 1 as reference estimation data. As another example, the computing device 115 may, for example, obtain the historical sensor data around 12:00 in the week before March 2 and use the average of the historical sensor data as reference estimation data.

In another example, the computing device 115 may input at least one of historical sensor data and the second time into a prediction model to determine the reference estimation data, wherein the prediction model is trained based on the historical sensor data and a reception time associated with the historical sensor data. It should be understood that any suitable model training techniques well known in the art may be employed to construct one or more models for predicting sensor data at a certain future time based on the historical sensor data, and will not be described in detail herein.

In a further example, the computing device 115 may also use a Kalman filter to determine the reference estimation data based on the historical sensor data. Specifically, the computing device 115 may use a Kalman filter to establish an update equation changing over time with respect to the sensor data of reference sensors 105-2 and 105-3, and the computing device 115 may use the update equation and the sensor data acquired the second time to predict the reference estimation data at the first time. In this manner, the computing device 115 does not need to store any historical sensor data for the reference sensors 105-2 and 105-3 since such historical sensor data will be embodied as an update equation in the Kalman filter, thereby greatly reducing an amount of data that need to be stored.

Further referring to FIG. 2, at block 206, the computing device 115 determines target estimation data of the target sensor at the first time based on the reference estimation data. Continuing with the example of FIG. 3, for example, after determining the reference estimation data of the reference sensors 105-2 and 105-3 at the first time, the computing device 115 may further predict the target estimation data of the target sensor 105-1 at the first time based on the reference sensor data. For example, an average value of the reference estimation data may be simply regarded as the target estimation data.

In some embodiments, the computing device 115 may further consider an impact of the distance on the prediction of the target estimation data. The specific process of block 206 will be described below with reference to FIG. 5, which illustrates a flow diagram of a process 206 of determining target estimation data in accordance with an embodiment of the present disclosure.

Figure 5:
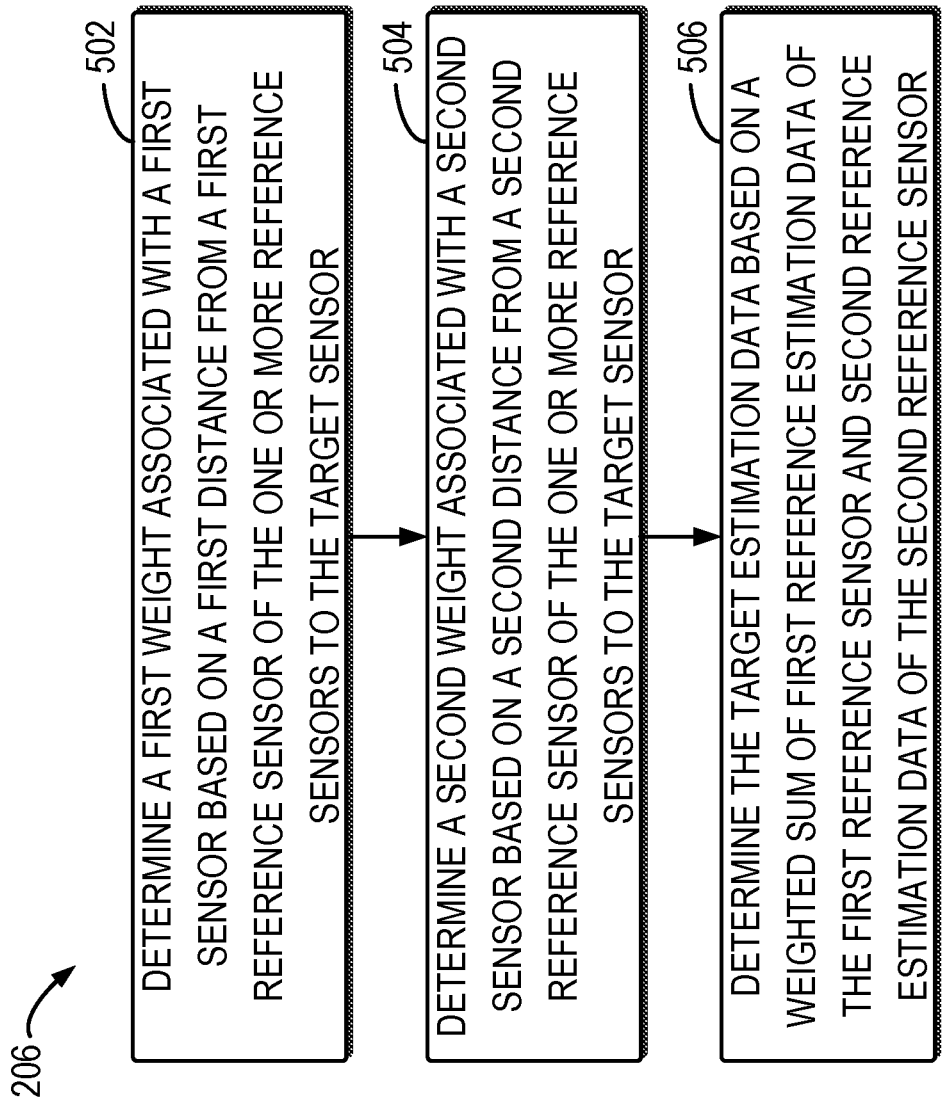
FIG. 5 illustrates a flowchart of a process of determining target estimation data according to an embodiment of the present disclosure.

As shown in FIG. 5, at block 502, the computing device 115 determines a first weight associated with a first sensor based on a first distance from a first reference sensor of the one or more reference sensors to the target sensor. At block 504, the computing device 115 determines a second weight associated with a second sensor based on a second distance from a second reference sensor of the one or more reference sensors to the target sensor. In some embodiments, the weight associated with the reference sensor may be expressed as a ratio of a reciprocal of the determined distance to a sum of all reciprocals. For example, in the example only with the first reference sensor and the second reference sensor, the first weight may be expressed as (1/first distance)/((1/first distance)+(1/second distance)), and the second weight may be expressed as (1/second distance)/((1/first distance)+(1/second distance)). It should be understood that such weight setting manner is merely illustrative and any suitable weight setting manner in the art may be employed.

At block 506, the computing device 115 determines the target estimation data based on a weighted sum of first reference estimation data for the first reference sensor and second reference estimation data for the second reference sensor. Specifically, in the example with only the first reference sensor and the second reference sensor, the target estimation data may be determined as (first reference estimation data*first weight+second reference estimation data*second weight). In this manner, the computing device 115 may further consider the distance from each reference sensor to the target sensor 105-1, thereby improving the prediction accuracy for the target estimation data.

In a further embodiment, the computing device 115 may employ techniques such as linear fitting to determine the target estimation data of the target sensor 105-1 based on the reference estimation data of the reference sensor. For example, taking the sensor as a temperature sensor as an example, linear fitting between a sensor position and a sensor temperature reading may be established, and an estimated reading of the target temperature sensor may be determined based on the linear fitting and the position of the target temperature sensor.

Further referring to FIG. 2, at block 208, the computing device 115 detects abnormity of the target data 110-1 based on the target data and the target estimation data. In some embodiments, the computing device 115 may compare the target data 110-1 with the determined target estimation data. In response to a difference between the target data 110-1 and the target estimation data exceeding a predetermined difference threshold, the computing device 115 may determine that the target data 110-1 is abnormal.

In a further embodiment, the computing device 115 may further process the target data 110-1 and the target estimation data by using a machine learning model to detect the abnormity of the target data 110-1, wherein the machine learning model is trained based on the historical sensor data, sensor estimation data and whether the historical sensor data is abnormal. For example, during use, the computing device 115 may store the obtained target estimation data, target data 110-1, and a manually annotated indication whether the sensor data is abnormal, and such data may be used to train the machine learning model to cause the trained machine learning model to have an ability to predict from the target data 110-1 and the target estimation data whether the target estimation data 110-1 is abnormal. In this way, as more and more historical data is accumulated in processing, the machine learning model will become more and more accurate, so that a more accurate abnormal data detection result may be obtained.

Additionally, after determining that the target data 110-1 is abnormal, the computing device 115 may provide an indication of an abnormality in the target data 110-1. For example, in an example of detecting an ambient temperature using a temperature sensor, when the prediction data determined based on surrounding neighbor sensors indicates that the current temperature data is abnormal, the computing device 115 may provide a warning regarding the abnormality so that a technician may confirm whether the temperature sensor is faulty or whether there is a risk of data being intruded (for example, data tamper).

Alternatively, after determining that there is an abnormality in the target data 110-1, the computing device 115 may filter out the target data 110-1 without processing the target data, for example, no longer transmitting the target data 110-1 to the cloud computing device 120. In this way, abnormal invalid data may be effectively excluded, thereby reducing the amount of calculation.

According to the solution of the present disclosure, the estimation value of the target sensor may be predicted by using data of a sensor that is spatially and temporally adjacent to the target sensor, thereby determining whether the target data of the target sensor is abnormal. In such a manner, it is possible to improve the speed and accuracy of predicting the target sensor data, so that it is possible to more efficiently and accurately determine whether the data of the target sensor is abnormal, and substantially reduce the amount of calculation required to determine the data abnormality.

Figure 6:
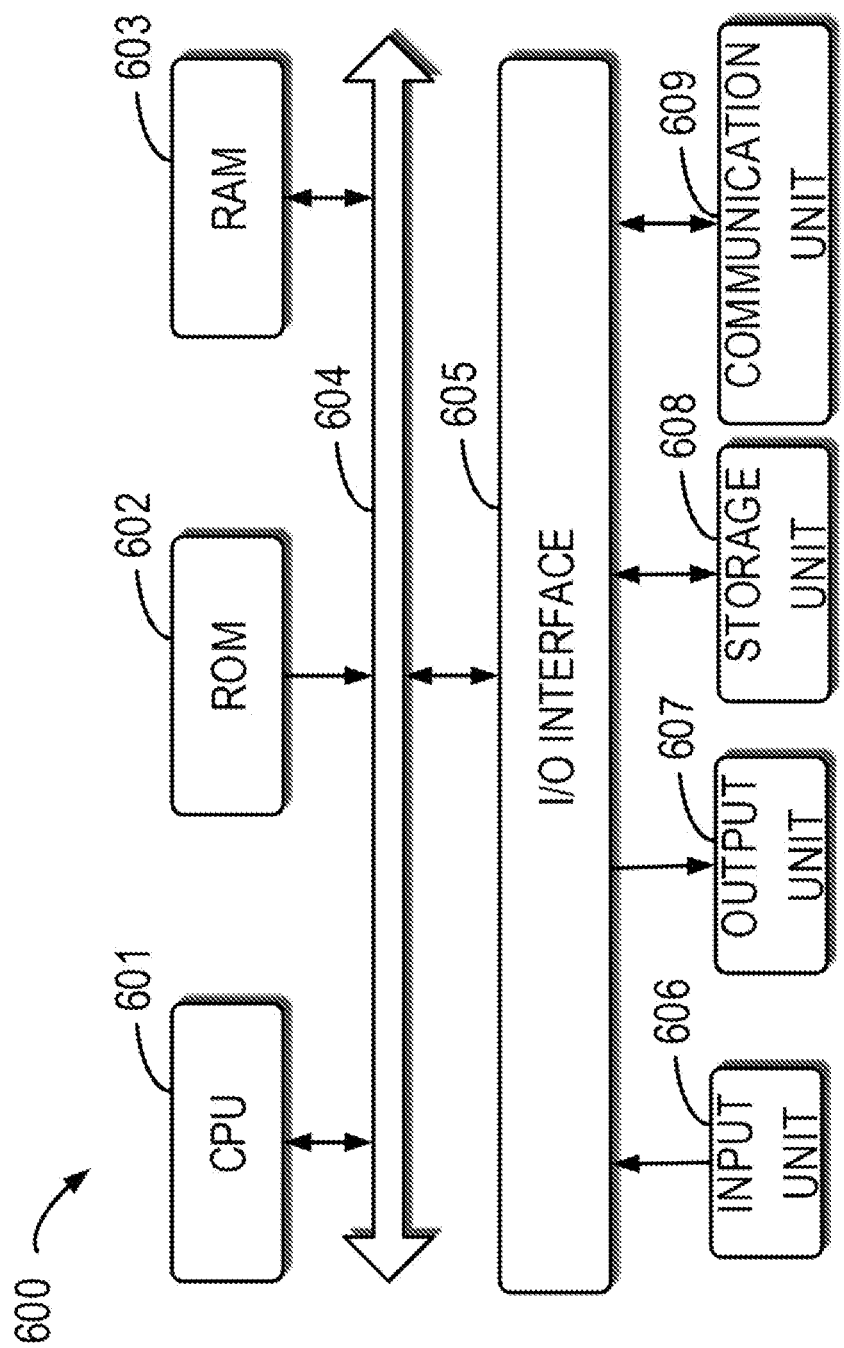
FIG. 6 illustrates a schematic block diagram of an example device that may be used to implement embodiments of the present disclosure.

FIG. 6 shows a schematic block diagram of an example device 600 that can be used to implement embodiments of the present disclosure. For example, the computing device 115 (as well as 120) as shown in FIG. 1 can be implemented by device 600. As shown, device 600 includes a central processing unit (CPU) 601 that can perform various appropriate actions according to computer program instructions stored in read only memory (ROM) 602 or loaded from storage unit 608 into a random access memory (RAM) 603. In the RAM 603, various programs and data required for the operation of the device 600 can also be stored. The CPU 601, the ROM 602, and the RAM 603 are connected to each other through a bus 604. An input/output (I/O) interface 605 is also coupled to bus 604.

A plurality of components in device 600 are coupled to I/O interface 605, including: input unit 606, such as a keyboard, mouse, etc.; output unit 607, such as various types of displays, speakers, etc.; storage unit 608, such as a disk and an optical unit, etc.; and a communication unit 609 such as a network card, a modem, a wireless communication transceiver, and the like. Communication unit 609 allows device 600 to exchange information/data with other devices over a computer network such as the Internet and/or various telecommunication networks.

The various processes described above, such as method 200, may be performed by processing unit 601. For example, in some embodiments, method 200 can be implemented as a computer software program that is tangibly embodied in a machine readable medium, such as storage unit 608. In some embodiments, some or the entire computer program may be loaded and/or installed onto device 600 via ROM 602 and/or communication unit 609. One or more actions of method 200 described above may be performed when a computer program is loaded into RAM 603 and executed by CPU 601.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming languages. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

What is claimed is:

1. A method for sensor data analysis, comprising:
in response to receiving target data from a target sensor of a plurality of sensors at a first time, determining one or more reference sensors of the plurality of sensors based on location information of a neighbor sensor of the plurality of sensors adjacent to the target sensor of the plurality of sensors and receiving latest data from the neighbor sensor of the plurality of sensors at a second time;
determining reference estimation data of the one or more reference sensors of the plurality of sensors at the first time based on historical sensor data obtained from the one or more reference sensors of the plurality of sensors;
determining target estimation data of the target sensor of the plurality of sensors at the first time based on the reference estimation data of the one or more reference sensors of the plurality of sensors;
detecting an abnormality of the target data of the target sensor of the plurality of sensors based on the target data of the target sensor of the plurality of sensors and the target estimation data of the target sensor of the plurality of sensors; and
causing one or more actions to be initiated in one or more sensors of the plurality of sensors based on the detected abnormality of the target data of the target sensor of the plurality of sensors;
wherein the determining the one or more reference sensors of the plurality of sensors, the determining the reference estimation data of the one or more reference sensors of the plurality of sensors, the determining the target estimation data of the target sensor of the plurality of sensors, the detecting, and the causing steps are executed by at least one computing device coupled to the plurality of sensors.

2. The method according to claim 1, wherein determining the one or more reference sensors of the plurality of sensors comprises:
determining a distance from the neighbor sensor of the plurality of sensors to the target sensor of the plurality of sensors;
determining a time difference between the second time and the first time; and
determining the one or more reference sensors of the plurality of sensors based on a weighted sum of the distance and the time difference.

3. The method according to claim 1, wherein determining the one or more reference sensors of the plurality of sensors comprises:
determining a plurality of groups of neighbor sensors located in different directions of the target sensor of the plurality of sensors; and
selecting at most a predetermined number of reference sensors from each group of neighbor sensors of the plurality of groups of neighbor sensors.

4. The method according to claim 1, wherein determining the reference estimation data of the one or more reference sensors of the plurality of sensors comprises:
using a Kalman filter to determine the reference estimation data of the one or more reference sensors of the plurality of sensors based on the historical sensor data.

5. The method according to claim 1, wherein determining the reference estimation data of the one or more reference sensors of the plurality of sensors comprises:
inputting at least one of the historical sensor data and the second time into a prediction model to determine the reference estimation data of the one or more reference sensors of the plurality of sensors, wherein the prediction model is trained based on the historical sensor data and a reception time associated with the historical sensor data.

6. The method according to claim 1, wherein determining the target estimation data of the target sensor of the plurality of sensors comprises:
determining a first weight associated with a first sensor based on a first distance from a first reference sensor of the one or more reference sensors of the plurality of sensors to the target sensor of the plurality of sensors;
determining a second weight associated with a second sensor based on a second distance from a second reference sensor of the one or more reference sensors of the plurality of sensors to the target sensor of the plurality of sensors; and
determining the target estimation data of the target sensor of the plurality of sensors based on a weighted sum of first reference estimation data of the first reference sensor of the one or more reference sensors of the plurality of sensors and second reference estimation data of the second reference sensor of the one or more reference sensors of the plurality of sensors.

7. The method according to claim 1, wherein detecting the abnormality of the target data of the target sensor of the plurality of sensors comprises:
in response to a difference between the target data of the target sensor of the plurality of sensors and the target estimation data of the target sensor of the plurality of sensors exceeding a predetermined difference threshold, determining that the target data of the target sensor of the plurality of sensors is abnormal.

8. The method according to claim 1, wherein detecting the abnormality of the target data of the target sensor of the plurality of sensors comprises:

processing the target data of the target sensor of the plurality of sensors and the target estimation data of the target sensor of the plurality of sensors by using a machine learning model to detect the abnormality of the target data of the target sensor of the plurality of sensors, wherein the machine learning model is trained based on the historical sensor data, sensor estimation data, and whether the historical sensor data is abnormal.

9. The method according to claim 1, further comprising:
in response to detecting that the target data of the target sensor of the plurality of sensors is abnormal, providing an indication of the abnormality of the target data of the target sensor of the plurality of sensors.

10. A device for sensor data analysis, comprising:
at least one processing unit; and
at least one memory being coupled to the at least one processing unit and storing instructions for execution by the at least one processing unit, the instructions, when executed by the at least one processing unit, cause the device, to perform acts comprising:
in response to receiving target data from a target sensor of a plurality of sensors at a first time, determining one or more reference sensors of the plurality of sensors based on location information of a neighbor sensor of the plurality of sensors adjacent to the target sensor of the plurality of sensors and receiving latest data from the neighbor sensor of the plurality of sensors at a second time;
determining reference estimation data of the one or more reference sensors of the plurality of sensors at the first time based on historical sensor data obtained from the one or more reference sensors of the plurality of sensors;
determining target estimation data of the target sensor of the plurality of sensors at the first time based on the reference estimation data of the one or more reference sensors of the plurality of sensors;
detecting an abnormality of the target data of the target sensor of the plurality of sensors based on the target data of the target sensor of the plurality of sensors and the target estimation data of the target sensor of the plurality of sensors; and
causing one or more actions to be initiated in one or more sensors of the plurality of sensors based on the detected abnormality of the target data of the target sensor of the plurality of sensors;
wherein the determining the one or more reference sensors of the plurality of sensors, the determining the reference estimation data of the one or more reference sensors of the plurality of sensors, the determining the target estimation data of the target sensor of the plurality of sensors, the detecting, and the causing steps are executed by the device coupled to the plurality of sensors.

11. The device according to claim 10, wherein determining the one or more reference sensors of the plurality of sensors comprises:
determining a distance from the neighbor sensor of the plurality of sensors to the target sensor of the plurality of sensors;
determining a time difference between the second time and the first time; and
determining the one or more reference sensors of the plurality of sensors based on a weighted sum of the distance and the time difference.

12. The device according to claim 10, wherein determining the one or more reference sensors of the plurality of sensors comprises:
determining a plurality of groups of neighbor sensors located in different directions of the target sensor of the plurality of sensors; and
selecting at most a predetermined number of reference sensors from each group of neighbor sensors of the plurality of groups of neighbor sensors.

13. The device according to claim 10, wherein determining the reference estimation data of the one or more reference sensors of the plurality of sensors comprises:
using a Kalman filter to determine the reference estimation data of the one or more reference sensors of the plurality of sensors based on the historical sensor data.

14. The device according to claim 10, wherein determining the reference estimation data of the one or more reference sensors of the plurality of sensors comprises:
inputting at least one of the historical sensor data and the second time into a prediction model to determine the reference estimation data of the one or more reference sensors of the plurality of sensors, wherein the prediction model is trained based on the historical sensor data and a reception time associated with the historical sensor data.

15. The device according to claim 10, wherein determining the target estimation data of the target sensor of the plurality of sensors comprises:
determining a first weight associated with a first sensor based on a first distance from a first reference sensor of the one or more reference sensors of the plurality of sensors to the target sensor of the plurality of sensors;
determining a second weight associated with a second sensor based on a second distance from a second reference sensor of the one or more reference sensors of the plurality of sensors to the target sensor of the plurality of sensors; and
determining the target estimation data of the target sensor of the plurality of sensors based on a weighted sum of first reference estimation data of the first reference sensor of the one or more reference sensors of the plurality of sensors and second reference estimation data of the second reference sensor of the one or more reference sensors of the plurality of sensors.

16. The device according to claim 10, wherein detecting the abnormality of the target data of the target sensor of the plurality of sensors comprises:
in response to a difference between the target data of the target sensor of the plurality of sensors and the target estimation data of the target sensor of the plurality of sensors exceeding a predetermined difference threshold, determining that the target data of the target sensor of the plurality of sensors is abnormal.

17. The device according to claim 10, wherein detecting the abnormality of the target data of the target sensor of the plurality of sensors comprises:
processing the target data of the target sensor of the plurality of sensors and the target estimation data of the target sensor of the plurality of sensors by using a machine learning model to detect the abnormality of the target data of the target sensor of the plurality of sensors, wherein the machine learning model is trained based on the historical sensor data, sensor estimation data, and whether the historical sensor data is abnormal.

18. The device according to claim 10, the acts further comprising:
in response to detecting that the target data of the target sensor of the plurality of sensors is abnormal, providing an indication of the abnormality of the target data of the target sensor of the plurality of sensors.

19. A computer program product being stored in a non-transitory computer storage medium and comprising machine-executable instructions which, when executed by a computing device, cause the computing device to perform sensor data analysis steps of:
in response to receiving target data from a target sensor of a plurality of sensors at a first time, determining one or more reference sensors of the plurality of sensors based on location information of a neighbor sensor of the plurality of sensors adjacent to the target sensor of the plurality of sensors and receiving latest data from the neighbor sensor of the plurality of sensors at a second time;
determining reference estimation data of the one or more reference sensors of the plurality of sensors at the first time based on historical sensor data obtained from the one or more reference sensors of the plurality of sensors;
determining target estimation data of the target sensor of the plurality of sensors at the first time based on the reference estimation data of the one or more reference sensors of the plurality of sensors;
detecting an abnormality of the target data of the target sensor of the plurality of sensors based on the target data of the target sensor of the plurality of sensors and the target estimation data of the target sensor of the plurality of sensors; and
causing one or more actions to be initiated in one or more sensors of the plurality of sensors based on the detected abnormality of the target data of the target sensor of the plurality of sensors;
wherein the determining the one or more reference sensors of the plurality of sensors, the determining the reference estimation data of the one or more reference sensors of the plurality of sensors, the determining the target estimation data of the target sensor of the plurality of sensors, the detecting, and the causing steps are executed by the computing device coupled to the plurality of sensors.

20. The computer program product according to claim 19, wherein determining the one or more reference sensors of the plurality of sensors comprises:
determining a distance from the neighbor sensor of the plurality of sensors to the target sensor of the plurality of sensors;
determining a time difference between the second time and the first time; and
determining the one or more reference sensors of the plurality of sensors based on a weighted sum of the distance and the time difference.

* * * * *